United States Patent [19]

Fischer

[11] 3,920,441

[45] Nov. 18, 1975

[54] SELECTIVE HERBICIDE COMPOSITIONS CONTAINING A SUBSTITUTED TRIAZINE DERIVATIVE AND A BENZO-2-THIA-1,3-DIAZINONE-(4)-2,2-DIOXIDE

[75] Inventor: Adolf Fischer, Mutterstadt, Germany

[73] Assignee: Badische Anilin- & Soda-Fabrik Aktiengesellschaft, Ludwigshafen (Rhine), Germany

[22] Filed: Feb. 21, 1973

[21] Appl. No.: 334,195

Related U.S. Application Data

[63] Continuation-in-part of Ser. No. 16,567, March 4, 1970, abandoned.

[30] Foreign Application Priority Data

Mar. 15, 1969 Germany............................ 1913266

[52] U.S. Cl........................................... 71/91; 71/93
[51] Int. Cl.² ............................................ A01N 9/12
[58] Field of Search................................. 71/91, 93

[56] References Cited
UNITED STATES PATENTS

| | | | |
|---|---|---|---|
| 3,554,732 | 1/1971 | Priola et al. ............................ | 71/93 |
| 3,621,017 | 11/1971 | Zeidler et al. .......................... | 71/91 |
| 3,708,277 | 1/1973 | Zeidler et al. .......................... | 71/91 |
| 3,787,198 | 1/1974 | Hagimato et al. ..................... | 71/118 |

*Primary Examiner*—James O. Thomas, Jr.
*Attorney, Agent, or Firm*—Johnston, Keil, Thompson & Shurtleff

[57] ABSTRACT

A herbicide comprising a mixture of a substituted triazine derivative with a benzo-2-thia-1,3-diazinone-(4)-2,2-dioxide derivative, and a process for controlling the growth of unwanted plants with these mixtures.

2 Claims, No Drawings

SELECTIVE HERBICIDE COMPOSITIONS CONTAINING A SUBSTITUTED TRIAZINE DERIVATIVE AND A BENZO-2-THIA-1,3-DIAZINONE-(4)-2,2-DIOXIDE

RELATED APPLICATION

This application is a continuation-in-part of my copending application Ser. No. 16,567, filed Mar. 4, 1970, now abandoned.

It is known to use triazine derivatives as postemergence selective herbicides in various crops, for instance Indian corn and cereals; however, they do not always have a satisfactory action, particularly on millet and sedge species.

We have now found that a mixture of
a. a triazine derivative having the formula

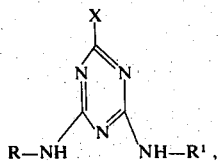

where X denotes chlorine, bromine, thiomethyl or methoxyl, R denotes a methyl, ethyl, isopropyl, methoxyisopropyl, ethoxyisopropyl radical, or the group

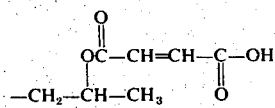

or its salts, and $R^1$ denotes an ethyl, isopropyl, tert-butyl, methoxypropyl, β-methoxyethyl, methoxyisopropyl, ethoxyisopropyl, propoxyisopropyl, thiomethylisopropyl, isopentynyl-

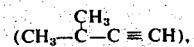

α, α-(bisethyl)-ethyl, α, α-(bismethyl)-propyl, α-cyanoisopropyl, isobutynyl-

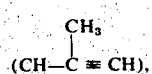

β-cyanoethyl or cyanopropyl radical, and
b. a benzo-2thia-1,3-diazinone-(4)-2,2derivative having the formula

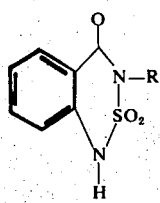

where R denotes a methyl, ethyl or isopropyl radical or their salts has a good herbicidal action. By salts we mean the alkali metal (potassium, sodium), alkaline earth metal (calcium, magnesium), ammonium or amine salts (dimethylamine, diethylamine, ethanolamine, diethanolamine, N,N-dimethylethanolamine).

The ratios of the components of the mixture may be varied at will; however, mixtures of 1 part by weight of a triazine derivative (a) to 0.1 to 10 parts by weight, particularly 0.2 to 5 parts by weight, of compound (b) are preferred.

Used selectively, the mixtures are especially effective on weed floras containing millet or sedge species.

The triazine active ingredients may be prepared for example by reacting cyanuric chloride, in the presence of a compound which binds hydrogen halide, with the appropriate alkyl-, alkynyl- or alkoxyalkylamines and, if X is not chlorine, with an alkali metal methylate, an alkali metal methylmercaptide, or an alkali metal cyanide in any sequence.

Preparation of 2-chloro-4-ethylamine-6-(butyn-1-yl-3-amino)-s-tri-azine:

At a temperature of −10° to −20°C, 135 parts by weight of ethylamine is added dropwise to a solution of 276 parts by weight of cyanuric chloride in 900 parts by weight of acetone. The mixture is subsequently stirred for an hour at −10° to −20°C and the precipitate formed is filtered off. The filtrate is freed, at room temperature and in vacuo, from solvent and the crystalline residue is recrystallized from cyclohexane. 233 parts by weight of 2,4-dichloro-6-ethylamino-s-triazine having a melting point of 103° to 105°C is obtained.

9.65 parts by weight of 2,4-dichloro-6-ethylamine-s-triazine is dissolved in 50 parts by weight of acetone; at a temperature of 15° to 20°C, a solution of 7 parts by weight of butyn-1-yl-3-amine in 25 parts by weight of acetone is then added. The mixture is subsequently stirred for 20 hours at room temperature (20°C) and the precipitate formed is then filtered off. The filtrate is freed from solvent in vacuo and the crystalline residue is recrystallized from cyclohexane. 10.5 parts by weight of 2-chloro-4-ethylamino-6-(butyn-1-yl-3-amino)-s-triazine having a melting point of 140°C is obtained.

Preparation of 2-methylmercapto-4-ethylamino-6-(butyn-1-yl-3-amino)-s-triazine:

At a temperature of −10° to −20°C, a solution of 48 parts by weight of methylmercaptan in 360 parts by weight of water in one dropping funnel and a solution of 40 parts by weight of sodium hydroxide in 360 parts by weight of water in a second dropping funnel are added simultaneously to a solution of 184 parts by weight of cyanuric chloride in 3,000 parts by weight of ethyl acetate. The mixture is subsequently stirred for 2 hours at −10°C. The organic phase is then separated and dried with magnesium sulfate, and the solvent is removed in vacuo at a temperature of up to 35°C. The crystalline residue is recrystallized from ligroin. 110 parts by weight of 2-methylmercapto-4,6-dichloro-s-triazine having a melting point of 58° to 60°C is obtained.

9.8 parts by weight of 2-methylmercapto-4,6-dichloro-s-triazine is suspended in 25 parts by weight of water and 15 parts by weight of acetone; 5.25 parts by weight of butyn-1-yl-3-amine hydrochloride, dissolved in 10 parts by weight of water, is then added. At a temperature of 25° to 40°C, a solution of 4 parts by weight of sodium hydroxide in 15 parts by weight of water is then added dropwise to this mixture. The reaction mixture is subsequently stirred for a few hours at 35°C, the oil which has separated is extracted with methylene chloride and the methylene chloride solution dried with magnesium sulfate. The solvent is removed in vacuo.

The oily residue becomes solid when triturated with ligroin. 9 parts by weight of 2-methylmercapto-4-chloro-6-(butyn-1-yl-3-amino)-s-triazine having a melting point of 56° to 58°C is obtained. 5.7 parts by weight of 2-methylmercapto-4-chloro-6-(butyn-1-yl-3-amino)-s-triazine is suspended in 25 parts by weight of water, 10 parts by weight of acetone and 3.5 parts by weight of 35% aqueous ethylamine solution; the mixture is heated under reflux and a solution of 1 part by weight of sodium hydroxide in 5 parts by weight of water is added dropwise. The mixture is then stirred for 3 hours at boiling temperature and cooled to room temperature. The oil which has separated is extracted with methylene chloride, the organic phase is dried and the solvent removed in vacuo. When toluene is added and the whole cooled, the oily residue becomes crystalline. 4.8 parts by weight of 2-methylmercapto-4-ethylamino-6-(butyn-1-yl-3-amino)-s-triazine having a boiling point of 95° to 97° is obtained.

At a temperature of −10° to −20°C, 90 parts by weight of ethylamine is added dropwise to 189 parts by weight of cyanuric chloride dissolved in 600 parts by weight of acetone. The reaction mixture is subsequently stirred for an hour at −10° to −20°C, the precipitated ethylamine hydrochloride is suction filtered and the filtrate freed from solvent in vacuo. The crystalline residue is recrystallized from cyclohexane. 189 parts by weight of 2,4-dichloro-6-ethylamino-1,3,5,-triazine having a melting point of 103° to 105°C is obtained.

At a temperature of 20° to 30°C, 13.2 parts by weight of α-methyl-β-methoxyethylamine is one dropping funnel and a solution of 6 parts by weight of sodium hydroxide in 20 parts by weight of water in a second dropping funnel are added simultaneously to a solution of 29 parts by weight of 2,4-dichloro-6-ethylamino-1,3,5,-triazine in 200 parts by weight of acetone. Stirring is subsequently carried out for a fairly long period of time at room temperature (20°C); the reaction mixture is filtered and the filtrate freed from solvent in vacuo. The crystalline residue is recrystallized from cyclohexane. 24 parts by weight of 2-chloro-4-ethylamino-6-(α-methyl-β-methoxyethyl)-amino-1,3,5-triazine having a melting point of 96°C is obtained.

At 20° to 25°C, 70 parts by weight of distilled β-aminopropionitrile is dripped into a solution of 97 parts by weight of 2-ethylamino-4,6-dichlorotriazine-(1,3,5) in 400 parts by weight of acetone. Stirring is continued overnight, the crystalline product is suction filtered, dissolved in acetone, concentrated, and the concentrate washed with water, filtered again and the dry product recrystallized from acetone; m.p. = 215° to 216°C (yield: 85% of the theory).

Some of the new active ingredients are listed below:
2-chloro-4-isopropylamino-6-(α-methyl-β-methoxyethyl)-amino-1,3,5-triazine, m.p. 124° to 125°C;
2-chloro-4-ethylamino-6-(α-methyl-β-methoxyethyl)-amino-1,3,5-triazine, m.p. 96°C;
2-chloro-4-methylamino-6-(α-methyl-β-methoxyethyl)-amino-1,3,5-triazine, m.p. 129° to 130°C;
2-thiomethyl-4-ethylamino-6-(β-methylthioethyl)-amino-1,3,5-triazine, m.p. 109° to 110°C;
2-chloro-4-isopropylamino-6-(β-cyanoethyl)-amino-1,3,5-triazine, m.p. 191° to 192°C; 2-methyl-4-chloro-6-cyanomethylamino-1,3,5-triazine, m.p. 252° to 253°C;
2-ethylamino-4-chlor-6-cyanomethylamino-1,3,5-triazine, m.p. 233° to 235°C;
2-isopropylamino-4-chloro-6-cyanomethylamino-1,3,5-triazine, m.p. 191° to 192°C;
2-chloro-4-tert-butylamino-6-cyanomethylamino-1,3,5-triazine, m.p. 150° to 151°C;
2-chloro-4-cyanomethylamino-6-n-butylamino-1,3,5-triazine, m.p. 170° to 171°C;
2-chloro-4-ethylamino-6-(3-methylbutyn-1yl3-amino)-s-triazine, m.p. 135° to 137°C;
2-chloro-4-isopropylamino-6-(3-methylbutyn-1-yl-3-amino)-s-trazine, m.p. 146° to 148°C;
2-methylmercapto-4-ethylamino-6-(butyn-1-yl-3-amino)-s-triazine, m.p. 95° to 97°C;
2-chloro-4-isopropylamino-6-(butyn-1-yl-3-amino)-s-triazine, m.p. 170° C;
2-chloro-4-ethylamino-6-(butyn-1-yl-3-amino)-s-triazine, m.p. 140°C;
2-chloro-4,6-bis-(butyn-1yl-3-amino)-s-triazine; m.p. 161°C.

The agents according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, the solution in water is suitable. However, hydrocarbons having boiling points higher than 150°C, e. g., tetrahydronaphthalene or alkylated naphthalenes, or organic liquids having boiling points higher than 150°C and one or more than one functional group, e. g., the keto group, ether group, ester group or amide group, this group being attached as substituent to a hydrocarbon chain or being a component of a heterocyclic ring, may also be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e. g., polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e. g., diatomaceous earth, talc, clay or fertilizers.

The active ingredients according to the invention may be used in admixture with fertilizers, other herbicides, fungicides and insecticides.

EXAMPLE 1

The plants Indian Corn (*Zea mays*), annual bluegrass (*Poa annua*), barnyard grass (*Echinochloa crus-galli*), green foxtail (*Setaria viridis*), smallflower umbrella-plant (*Cyperus difformis*), purple nutsedge (*Cyperus rotundus*), ladysthumb (*Polygonum persicaria*), and tall morningglory (*Ipomoea purpurea*) are treated at a growth height of 5 to 19 cm with he stated amounts of the following active ingredients and mixtures of them, each amount and each mixture being dispersed in 500 liters of water per hectare:

I 2-chloro-4-ethylamino-6-isopropylamino-1,3,5-triazine, 0.5 and 2 kg per hectare;
II 3-isopropyl-2,1,3-benzothiadiazinone-(4)-2,2-dioxide, 1.5 and 2 kg per hectare;
I + II : 0.5 + 1.5 kg per hectare.

After 5 to 7 days in warm weather, it is ascertained that the onset of action of the mixture on the grass weeds is considerably quicker than that of the individual active ingredients; moreover, the compatibility of the mixture with Indian corn is good.

The results of the experiment are given in the following table:

| kg per hectare of active ingredient | I 0.5 | I 2 | II 1.5 | II 2 | I + II 0.5 + 1.5 |
|---|---|---|---|---|---|
| Zea mays | 0 | 0 | 0 | 0 | 0 |
| Poa annua | 75 | 100 | 5 | 10 | 80 |
| Echinochloa crus-galli | 15 | 5 | 5 | 10 | 25 |
| Setaria viridis | 10 | 45 | 0 | 5 | 15 |
| Cyperus difformis | 10 | 40 | 80 | 90 | 95 |
| Cyperus rotundus | 10 | 35 | 60 | 85 | 95 |
| Polygonum persicaria | 20 | 75 | 65 | 80 | 85 |
| Ipomoea purpurea | 5 | 20 | 30 | 45 | 45 |

0 = no damage
100 = complete destruction

EXAMPLE 2

In the open, the plants Indian corn (*Zea mays*), redroot pigweed (*Amaranthus retroflexus*), purple nutsedge (*Cyperus rotundus*), large crabgrass (*Digitaria sanguinalis*), common purslane (*Portulaca oleracea*) and giant foxtail (*Setaria faberii*) were treated at a growth height of 2 to 17 cm with the following amounts of the following individual active ingredients and mixtures thereof:

I  3-isopropyl-2,1,3-benzothiadiazinone-(4)-2,2-dioxide, sodium salt
 0.25, 0.5, 0.75 and 1.0 kg/ha;
II  3-isopropyl-2,1,3-benzothiadiazinone-(4)-2,2-dioxide, dimethylamine salt
 0.25, 0.5, 0.75 and 1.0 kg/ha;
III  3-isopropyl-2,1,3-benzothiadiazinone-(4)-2,2-dioxide, diethanolamine salt
 0.25, 0.5 0.75 and 1.0 kg/ha;
IV  3-isopropyl-2,1,3-benzothiadiazinone-(4)-2,2-dioxide,
 0.25, 0.5, 0.75 and 1.0 kg/ha;
V  2-ethylamino-4-(1-methyl-3-oxabutyl)-amino-6-chloro-1,3,5-triazine,
 0.25, 0.5, 0.75 and 1.0 kg/ha;
VI  2-chloro-4-ethylamino-6-isopropylamino-1,3,5-triazine,
 0.25, 0.5, 0.75 and 1.0 kg/ha;
I + V 0.25 + 0.75, 0.75 + 0.25, 0.5 + 0.5 and 0.25 + 0.25 kg/ha;
II + V 0.25 + 0.75, 0.75 + 0.25, 0.5 + 0.5 and 0.25 + 0.25 kg/ha;
III + V 0.25 + 0.75, 0.75 + 0.25, 0.5 + 0.5 and 0.25 + 0.25 kg/ha;
IV + V 0.25 + 0.75, 0.75 + 0.25, 0.5 + 0.5 and 0.25 + 0.25 kg/ha;
I + VI 0.25 + 0.75, 0.75 + 0.25, 0.5 + 0.5 and 0.25 + 0.25 kg/ha;
II + VI 0.25 + 0.75, 0.75 + 0.25, 0.5 + 0.5 and 0.25 + 0.25 kg/ha;
III + VI 0.25 + 0.75, 0.75 + 0.25, 0.5 + 0.5 and 0.25 + 0.25 kg/ha;
IV + VI 0.25 + 0.75, 0.75 + 0.25, 0.5 + 0.5 and 0.25 + 0.25 kg/ha.

After 12 to 16 days it was ascertained that the mixtures I + V, II + V, III + V, IV + V, I + VI, II + VI, III + VI and IV + VI had a better herbicidal action than that of their individual components, combined with the same good crop plant compatibility. The results of this experiment are given below:

| kg/ha | I 0.25 | 0.5 | 0.75 | 1.0 |
|---|---|---|---|---|
| Crop plant: | | | | |
| Zea mays | 0 | 0 | 0 | 0 |
| Unwanted plants: | | | | |
| Amaranthus retroflexus | 10 | 16 | 35 | 40 |
| Cyperus rotundus | 10 | 15 | 30 | 85 |
| Digitaria sanguinalis | 0 | 3 | 5 | 5 |
| Portulaca oleracea | 15 | 33 | 50 | 65 |
| Setaria faberii | 0 | 4 | 8 | 10 |

| kg/ha | II 0.25 | 0.5 | 0.75 | 1.0 |
|---|---|---|---|---|
| Crop plant: | | | | |
| Zea mays | 0 | 0 | 0 | 0 |
| Unwanted plants: | | | | |
| Amaranthus retroflexus | 12 | 20 | 38 | 45 |
| Cyperus rotundus | 15 | 20 | 32 | 45 |
| Digitaria sanguinalis | 0 | 5 | 6 | 7 |
| Portulaca oleracea | 16 | 35 | 52 | 68 |
| Setaria faberii | 0 | 5 | 7 | 10 |

| kg/ha | III 0.25 | 0.5 | 0.75 | 1.0 |
|---|---|---|---|---|
| Crop plant: | | | | |
| Zea mays | 0 | 0 | 0 | 0 |
| Unwanted plants: | | | | |
| Amaranthus retroflexus | 14 | 30 | 45 | 55 |
| Cyperus rotundus | 12 | 20 | 35 | 45 |
| Digitaria sanguinalis | 0 | 5 | 7 | 8 |
| Portulaca oleracea | 19 | 39 | 55 | 70 |
| Setaria faberii | 0 | 5 | 8 | 10 |

| kg/ha | IV 0.25 | 0.5 | 0.75 | 1.0 |
|---|---|---|---|---|
| Crop plant: | | | | |
| Zea mays | 0 | 0 | 0 | 0 |
| Unwanted plants: | | | | |
| Amaranthus retroflexus | 20 | 30 | 35 | 40 |
| Cyperus rotundus | 15 | 25 | 60 | 65 |
| Digitaria sanguinalis | 0 | 5 | 7 | 10 |

| IV | | | | |
|---|---|---|---|---|
| kg/ha | 0.25 | 0.5 | 0.75 | 1.0 |
| Portulaca oleracea | 22 | 40 | 57 | 70 |
| Setaria faberii | 0 | 5 | 8 | 10 |

| V | | | | |
|---|---|---|---|---|
| kg/ha | 0.25 | 0.5 | 0.75 | 1.0 |
| Crop plant: | | | | |
| Zea mays | 0 | 0 | 0 | 0 |
| Unwanted plants: | | | | |
| Amaranthus retroflexus | 10 | 18 | 24 | 30 |
| Cyperus rotundus | 5 | 10 | 15 | 20 |
| Digitaria sanguinalis | 10 | 21 | 30 | 48 |
| Portulaca oleracea | 10 | 20 | 27 | 35 |
| Setaria faberii | 7 | 15 | 23 | 30 |

| VI | | | | |
|---|---|---|---|---|
| kg/ha | 0.25 | 0.5 | 0.75 | 1.0 |
| Crop plants: | | | | |
| Zea mays | 0 | 0 | 0 | 0 |
| Unwanted plants: | | | | |
| Amaranthus retroflexus | 15 | 24 | 38 | 50 |
| Cyperus rotundus | 5 | 10 | 17 | 25 |
| Digitaria sanguinalis | 15 | 25 | 39 | 52 |
| Portulaca oleracea | 19 | 35 | 58 | 80 |
| Setaria faberii | 10 | 15 | 20 | 25 |

| I + V | | | | |
|---|---|---|---|---|
| kg/ha | 0.25 + 0.75 | 0.75 + 0.25 | 0.5 + 0.5 | 0.25 + 0.25 |
| Crop plant: | | | | |
| Zea mays | 0 | 0 | 0 | 0 |
| Unwanted plants: | | | | |
| Amaranthus retroflexus | 69 | 78 | 75 | 50 |
| Cyperus rotundus | 60 | 67 | 58 | 53 |
| Digitaria sanguinalis | 70 | 65 | 61 | 49 |
| Portulaca oleracea | 86 | 96 | 93 | 70 |
| Setaria faberii | 57 | 52 | 50 | 43 |

| II + V | | | | |
|---|---|---|---|---|
| kg/ha | 0.25 + 0.75 | 0.75 + 0.25 | 0.5 + 0.5 | 0.25 + 0.25 |
| Crop plant: | | | | |
| Zea mays | 0 | 0 | 0 | 0 |
| Unwanted plants: | | | | |
| Amaranthus retrofleux | 77 | 81 | 68 | 55 |
| Cyperus rotundus | 62 | 69 | 71 | 60 |
| Digitaria sanguinalis | 71 | 57 | 72 | 51 |
| Portulaca oleracea | 84 | 94 | 92 | 70 |
| Setaria faberii | 54 | 49 | 50 | 45 |

| III + V | | | | |
|---|---|---|---|---|
| kg/ha | 0.25 + 0.75 | 0.75 + 0.25 | 0.5 + 0.5 | 0.25 + 0.25 |
| Crop plant: | | | | |
| Zea mays | 0 | 0 | 0 | 0 |
| Unwanted plants: | | | | |
| Amaranthus retroflexus | 70 | 95 | 82 | 62 |
| Cyperus rotundus | 64 | 80 | 68 | 56 |
| Digitaria sanguinalis | 75 | 56 | 70 | 45 |
| Portulaca oleracea | 87 | 97 | 95 | 74 |
| Setaria faberii | 54 | 57 | 60 | 48 |

| IV + V | | | | |
|---|---|---|---|---|
| kg/ha | 0.25 + 0.75 | 0.75 + 0.25 | 0.5 + 0.5 | 0.25 + 0.25 |
| Crop plant: | | | | |
| Zea mays | 0 | 0 | 0 | 0 |
| Unwanted plants: | | | | |
| Amaranthus retroflexus | 87 | 85 | 78 | 70 |
| Cyperus rotundus | 70 | 97 | 75 | 68 |
| Digitaria sanguinalis | 68 | 52 | 65 | 49 |
| Portulaca oleracea | 80 | 96 | 91 | 78 |
| Setaria faberii | 54 | 50 | 52 | 49 |

| I + VI | | | | |
|---|---|---|---|---|
| kg/ha | 0.25 + 0.75 | 0.75 + 0.25 | 0.5 + 0.5 | 0.25 + 0.25 |
| Crop plant: | | | | |
| Zea mays | 0 | 0 | 0 | 0 |
| Unwanted plants: | | | | |
| Amaranthus retroflexus | 90 | 95 | 80 | 65 |
| Cyperus rotundus | 65 | 75 | 67 | 55 |
| Digitaria sanguinalis | 75 | 65 | 70 | 50 |
| Portulaca oleracea | 100 | 100 | 100 | 85 |
| Setaria faberii | 60 | 55 | 60 | 50 |

| kg/ha | 0.25 + 0.75 | II + VI 0.75 + 0.25 | 0.5 + 0.5 | 0.25 + 0.25 |
|---|---|---|---|---|
| Crop plant: | | | | |
| Zea mays | 0 | 0 | 0 | 0 |
| Unwanted plants: | | | | |
| Amaranthus retroflexus | 90 | 96 | 84 | 68 |
| Cyperus rotundus | 75 | 85 | 70 | 65 |
| Digitaria sanguinalis | 75 | 71 | 68 | 52 |
| Portulaca oleracea | 100 | 100 | 100 | 85 |
| Setaria faberii | 59 | 51 | 56 | 52 |

| kg/ha | 0.25 + 0.75 | III + VI 0.75 + 0.25 | 0.5 + 0.5 | 0.25 + 0.25 |
|---|---|---|---|---|
| Crop plant: | | | | |
| Zea mays | 0 | 0 | 0 | 0 |
| Unwanted plants: | | | | |
| Amaranthus retroflexus | 92 | 95 | 90 | 65 |
| Cyperus rotundus | 70 | 80 | 70 | 57 |
| Digitaria sanguinalis | 75 | 68 | 66 | 53 |
| Portulaca oleracea | 100 | 100 | 100 | 90 |
| Setaria faberii | 60 | 59 | 65 | 60 |

| kg/ha | 0.25 + 0.75 | IV + VI 0.75 + 0.25 | 0.5 + 0.5 | 0.25 + 0.25 |
|---|---|---|---|---|
| Crop plant: | | | | |
| Zea mays | 0 | 0 | 0 | 0 |
| Unwanted plants: | | | | |
| Amaranthus retroflexus | 93 | 98 | 94 | 75 |
| Cyperus rotundus | 70 | 90 | 74 | 60 |
| Digitaria sanguinalis | 75 | 68 | 70 | 55 |
| Portulaca oleracea | 100 | 100 | 100 | 90 |
| Setaria faberii | 63 | 60 | 65 | 55 |

0 = no damage
100 = complete destruction

EXAMPLE 3

In the greenhouse the plants Indian corn (*Zea mays*), redroot pigweed (*Amaranthus retroflexus*), purple nutsedge (*Cyperus rotundus*), large crabgrass (*Digitaria sanguinalis*), giant foxtail (*Setaria faberii*) and common cocklebur (*Xanthium pensylvanicum*) were treated at a growth height of 2 to 17 cm with the following amounts of the following individual active ingredients and mixtures thereof:

I 3-isopropyl-2,1,3-benzothiadiazinone-(4)-2,2-dioxide, sodium salt
0.5, 1.0, 1.5, 2.0, 2.5 and 3.0 kg/ha;
II 3-isopropyl-2,1,3-benzothiadiazinone-(4)-2,2-dioxide, dimethylamine salt
0.5, 1.0, 1.5, 2.0, 2.5 and 3.0 kg/ha;
III 3-isopropyl-2,1,3-benzothiadiazinone-(4)-2,2-dioxide, diethanolamine salt
0.5, 1.0, 1.5, 2.0, 2.5 and 3.0 kg/ha
IV 3-isopropyl-2,1,3-benzothiadiazinone-(4)-2,2-dioxide,
0.5, 1.0, 1.5, 2.0, 2.5 and 3.0 kg/ha;
V 2-ethylamino-4-(1-methyl-3-oxabutyl)-amino-6-chloro-1,3,5-triazine,
0.5, 1.0, 1.5, 2.0, 2.5 and 3.0 kg/ha;
VI 2-chloro-4-ethylamino-6-isopropylamino-1,3,5-triazine,
0.5, 1.0, 1.5, 2.0, 2.5 and 3.0 kg/ha;
VII 2-(2-chloro-4-ethylamino-1,3,5-triazin-6-ylamino)-2-methylpropionitrile,
0.5, 1.0, 1.5, 2.0, 2.5 and 3.0 kg/ha;
VIII N-(4-chlorophenyl)-N'-methoxy-N'-methylurea,
1.0, 1.5, 2.0 and 3.0 kg/ha;
I + V 1.5 + 0.5, 0.5 + 1.5, 1.0 + 1.0, 0.5 + 2.5, 2.5 + 0.5 and 1.5 + 1.5 kg/ha;
II + V 1.5 + 0.5, 0.5 + 1.5, 1.0 + 1.0, 0.5 + 2.5, 2.5 + 0.5 and 1.5 + 1.5 kg/ha;
III + V 1.5 + 0.5, 0.5 + 1.5, 1.0 + 1.0, 0.5 + 2.5, 2.5 + 0.5 and 1.5 + 1.5 kg/ha;
IV + V 1.5 + 0.5, 0.5 + 1.5, 1.0 + 1.0, 0.5 + 2.5, 2.5 + 0.5 and 1.5 + 1.5 kg/ha;
I + VI 1.5 + 0.5, 0.5 + 1.5, 1.0 + 1.0, 0.5 + 2.5, 2.5 + 0.5 and 1.5 + 1.5 kg/ha;
II + VI 1.5 + 0.5, 0.5 + 1.5, 1.0 + 1.0, 0.5 + 2.5, 2.5 + 0.5 and 1.5 + 1.5 kg/ha;
III + VI 1.5 + 0.5, 0.5 + 1.5, 1.0 + 1.0, 0.5 + 2.5, 2.5 + 0.5 and 1.5 + 1.5 kg/ha;
IV + VI 1.5 + 0.5, 0.5 + 1.5, 1.0 + 1.0, 0.5 + 2.5, 2.5 + 0.5 and 1.5 + 1.5 kg/ha;
I + VII 1.5 + 0.5, 0.5 + 1.5, 1.0 + 1.0, 0.5 + 2.5, 2.5 + 0.5 and 1.5 + 1.5 kg/ha;
II + VII 1.5 + 0.5, 0.5 + 1.5, 1.0 + 1.0, 0.5 + 2.5, 2.5 + 0.5 and 1.5 + 1.5 kg/ha; III + VII 1.5 + 0.5, 0.5 + 1.5, 1.0 + 1.0, 0.5 + 2.5, 2.5 + 0.5 and 1.5 + 1.5 kg/ha;
IV + VII 1.5 + 0.5, 0.5 + 1.5, 1.0 + 1.0, 0.5 + 2.5, 2.5 + 0.5and 1.5 + 1.5 kg/ha;
I + VIII 1.0 + 1.0 and 1.5 + 1.5 kg/ha;
II + VIII 1.0 + 1.0 and 1.5 + 1.5 kg/ha;
III + VIII 1.0 + 1.0 and 1.5 + 1.5 kg/ha;
IV + VIII 1.0 + 1.0 and 1.5 + 1.5 kg/ha.

After 12 to 14 days it was ascertained that mixtures of active ingredients I to VII had superior crop plant compatibility combined with the good herbicidal action as their individual components. Mixtures with active ingredient VIII (non-inventive; used for comparison purposes) caused considerable damage to the crop plants.

The results of the experiment are given below:

I

| kg/ha | 0.5 | 1.0 | 1.5 | 2.0 | 2.5 | 3.0 |
|---|---|---|---|---|---|---|
| Crop plant: | | | | | | |
| Zea mays | 0 | 0 | 0 | 0 | 0 | 5 |
| Unwanted plants: | | | | | | |
| Amaranthus retroflexus | 16 | 40 | 55 | 75 | 82 | 95 |
| Cyperus rotundus | 15 | 35 | 50 | 60 | 75 | 90 |
| Digitaria sanguinalis | 3 | 5 | 10 | 13 | 15 | 20 |
| Setaria faberii | 4 | 10 | 15 | 19 | 20 | 24 |
| Xanthium pensylvanicum | 20 | 50 | 60 | 78 | 86 | 95 |

II

| kg/ha | 0.5 | 1.0 | 1.5 | 2.0 | 2.5 | 3.0 |
|---|---|---|---|---|---|---|
| Crop plant | | | | | | |
| Zea mays | 0 | 0 | 0 | 0 | 0 | 5 |
| Unwanted plants: | | | | | | |
| Amaranthus retroflexus | 20 | 45 | 60 | 80 | 90 | 98 |
| Cyperus rotundus | 18 | 45 | 60 | 80 | 95 | 100 |
| Digitaria sanguinalis | 5 | 7 | 10 | 14 | 17 | 20 |
| Setaria faberii | 5 | 8 | 10 | 14 | 19 | 23 |
| Xanthium pensylvanicum | 34 | 50 | 63 | 79 | 87 | 98 |

III

| kg/ha | 0.5 | 1.0 | 1.5 | 2.0 | 2.5 | 3.0 |
|---|---|---|---|---|---|---|
| Crop plant: | | | | | | |
| Zea mays | 0 | 0 | 0 | 0 | 0 | 5 |
| Unwanted plants: | | | | | | |
| Amaranthus retroflexus | 30 | 55 | 70 | 90 | 97 | 100 |
| cyperus rotundus | 20 | 45 | 65 | 90 | 95 | 100 |
| Digitaria sanguinalis | 5 | 8 | 10 | 10 | 15 | 20 |
| Setaria faberii | 5 | 10 | 12 | 15 | 20 | 25 |
| Xanthium pensylvanicum | 36 | 60 | 75 | 84 | 95 | 100 |

IV

| kg/ha | 0.5 | 1.0 | 1.5 | 2.0 | 2.5 | 3.0 |
|---|---|---|---|---|---|---|
| Crop plants: | | | | | | |
| Zea mays | 0 | 0 | 0 | 0 | 0 | 5 |
| Unwanted plants: | | | | | | |
| Amaranthus retroflexus | 30 | 40 | 60 | 80 | 95 | 100 |
| Cyperus rotundus | 25 | 65 | 80 | 90 | 95 | 100 |
| Digitaria sanguinalis | 5 | 10 | 10 | 15 | 17 | 20 |
| Setaria faberii | 5 | 5 | 10 | 20 | 22 | 25 |
| Xanthium pensylvanicum | 30 | 40 | 60 | 65 | 87 | 95 |

V

| kg/ha | 0.5 | 1.0 | 1.5 | 2.0 | 2.5 | 3.0 |
|---|---|---|---|---|---|---|
| Crop plant: | | | | | | |
| Zea mays | 0 | 0 | 0 | 0 | 5 | 10 |
| Unwanted plants: | | | | | | |
| Amaranthus retroflexus | 18 | 30 | 40 | 55 | 70 | 80 |
| Cyperus rotundus | 10 | 20 | 30 | 35 | 43 | 50 |
| Digitaria sanguinalis | 21 | 48 | 65 | 90 | 95 | 100 |
| Setaria faberii | 15 | 30 | 45 | 65 | 75 | 90 |
| Xantium pensylvanicum | 13 | 30 | 37 | 50 | 64 | 85 |

VI

| kg/ha | 0.5 | 1.0 | 1.5 | 2.0 | 2.5 | 3.0 |
|---|---|---|---|---|---|---|
| Crop plant: | | | | | | |
| Zea mays | 0 | 0 | 0 | 0 | 10 | 15 |
| Unwanted plants: | | | | | | |
| Amaranthus retroflexus | 24 | 50 | 68 | 95 | 98 | 100 |
| Cyperus rotundus | 10 | 25 | 30 | 35 | 51 | 70 |
| Digitaria sanguinalis | 25 | 52 | 73 | 95 | 98 | 100 |
| Setaria faberii | 15 | 25 | 35 | 46 | 58 | 65 |
| Xanthium pensylvanicum | 10 | 22 | 30 | 43 | 50 | 69 |

VII

| kg/ha | 0.5 | 1.0 | 1.5 | 2.0 | 2.5 | 3.0 |
|---|---|---|---|---|---|---|
| Crop plant: | | | | | | |
| Zea mays | 0 | 0 | 0 | 0 | 5 | 10 |
| Unwanted plants: | | | | | | |
| Amaranthus retroflexus | 15 | 27 | 41 | 58 | 80 | 90 |
| Cyperus rotundus | 10 | 17 | 30 | 36 | 42 | 54 |
| Digitaria sanguinalis | 20 | 45 | 60 | 85 | 95 | 100 |
| Setaria faberii | 13 | 28 | 40 | 60 | 74 | 90 |
| Xanthium pensylvanicum | 10 | 20 | 34 | 45 | 52 | 71 |

VIII

| kg/ha | 1.0 | 1.5 | 2.0 | 3.0 |
|---|---|---|---|---|
| Crop plant: | | | | |
| Zea mays | 20 | 30 | 38 | 65 |
| Unwanted plants: | | | | |
| Amaranthus retroflexus | 20 | 35 | 60 | 98 |
| Cyperus rotundus | 30 | 40 | 65 | 95 |

| kg/ha | \multicolumn{4}{c}{VIII -continued} | | | |
|---|---|---|---|---|
| | 1.0 | 1.5 | 2.0 | 3.0 |
| Digitaria sanguinalis | 40 | 65 | 85 | 100 |
| Setaria faberii | 36 | 50 | 70 | 100 |
| Xanthium pensylvanicum | 20 | 32 | 45 | 90 |

| | I + V | | | |
|---|---|---|---|---|
| kg/ha | 1.5 + 0.5 | 0.5 + 1.5 | 1.0 + 1.0 | 0.5 + 2.5 |
| Crop plant: | | | | |
| Zea mays | 0 | 0 | 0 | 5 |
| Unwanted plants: | | | | |
| Amaranthus retroflexus | 100 | 95 | 95 | 100 |
| Cyperus rotundus | 95 | 85 | 90 | 90 |
| Digitaria sanguinalis | 65 | 97 | 92 | 100 |
| Setaria faberii | 70 | 90 | 90 | 100 |
| Xanthium pensylvanicum | 100 | 100 | 100 | 100 |

| | I + V | | II + V | |
|---|---|---|---|---|
| kg/ha | 2.5 + 0.5 | 1.5 + 1.5 | 1.5 + 0.5 | 0.5 + 1.5 |
| Crop plant: | | | | |
| Zea mays | 0 | 0 | 0 | 0 |
| Unwanted plants: | | | | |
| Amaranthus retroflexus | 100 | 100 | 100 | 95 |
| Cyperus rotundus | 100 | 100 | 100 | 87 |
| Digitaria sanguinalis | 80 | 100 | 70 | 95 |
| Setaria faberii | 75 | 95 | 65 | 90 |
| Xanthium pensylvanicum | 100 | 100 | 100 | 100 |

| | II + V | | | |
|---|---|---|---|---|
| kg/ha | 1.0 + 1.0 | 0.5 + 2.5 | 2.5 + 0.5 | 1.5 + 1.5 |
| Crop plant: | | | | |
| Zea mays | 0 | 5 | 0 | 0 |
| Unwanted plants: | | | | |
| Amaranthus retroflexus | 100 | 100 | 100 | 100 |
| Cyperus rotundus | 98 | 95 | 100 | 100 |
| Digitaria sanguinalis | 95 | 100 | 74 | 100 |
| Setaria faberii | 78 | 100 | 75 | 95 |
| Xanthium pensylvanicum | 100 | 100 | 100 | 100 |

| | III + V | | | |
|---|---|---|---|---|
| kg/ha | 1.5 + 0.5 | 0.5 + 1.5 | 1.0 + 1.0 | 0.5 + 2.5 |
| Crop plant: | | | | |
| Zea mays | 0 | 0 | 0 | 5 |
| Unwanted plants: | | | | |
| Amaranthus retroflexus | 100 | 97 | 100 | 100 |
| Cyperus rotundus | 100 | 88 | 97 | 97 |
| Digitaria sanguinalis | 70 | 98 | 95 | 100 |
| Setaria faberii | 68 | 90 | 80 | 100 |
| Xanthium pensylvanicum | 100 | 100 | 100 | 100 |

| | III + V | | IV + V | |
|---|---|---|---|---|
| kg/ha | 2.5 + 0.5 | 1.5 + 1.5 | 1.5 + 0.5 | 0.5 + 1.5 |
| Crop plant: | | | | |
| Zea mays | 0 | 0 | 0 | 0 |
| Unwanted plants: | | | | |
| Amaranthus retroflexus | 100 | 100 | 100 | 100 |
| Cyperus rotundus | 100 | 100 | 100 | 95 |
| Digitaria sanguinalis | 74 | 100 | 72 | 100 |
| Setaria faberii | 75 | 96 | 68 | 90 |
| Xanthium pensylvanicum | 100 | 100 | 100 | 95 |

| | IV + V | | | |
|---|---|---|---|---|
| kg/ha | 1.0 + 1.0 | 0.5 + 2.5 | 2.5 + 0.5 | 1.5 + 1.5 |
| Crop plant: | | | | |
| Zea mays | 0 | 5 | 0 | 0 |
| Unwanted plants: | | | | |
| Amaranthus retroflexus | 100 | 100 | 100 | 100 |
| Cyperus rotundus | 100 | 95 | 100 | 100 |
| Digitaria sanguinalis | 97 | 100 | 80 | 100 |
| Setaria faberii | 85 | 100 | 76 | 95 |
| Xanthium pensylvanicum | 100 | 100 | 100 | 100 |

| | I + VI | | | |
|---|---|---|---|---|
| kg/ha | 1.5 + 0.5 | 0.5 + 1.5 | 1.0 + 1.0 | 0.5 + 2.5 |
| Crop plant: | | | | |
| Zea mays | 0 | 0 | 0 | 10 |
| Unwanted plants: | | | | |
| Amaranthus retroflexus | 100 | 100 | 100 | 100 |
| Cyperus rotundus | 97 | 85 | 98 | 100 |
| Digitaria sanguinalis | 75 | 100 | 92 | 100 |
| Setaria faberii | 70 | 80 | 80 | 95 |
| Xanthium pensylvanicum | 100 | 90 | 100 | 97 |

-continued

| kg/ha | I + VI | | II + VI | |
|---|---|---|---|---|
| | 2.5 + 0.5 | 1.5 + 1.5 | 1.5 + 0.5 | 0.5 + 1.5 |
| Crop plant: | | | | |
| Zea mays | 0 | 0 | 0 | 0 |
| Unwanted plants: | | | | |
| Amaranthus retroflexus | 100 | 100 | 100 | 100 |
| Cyperus rotundus | 100 | 100 | 100 | 89 |
| Digitaria sanguinalis | 76 | 100 | 73 | 100 |
| Setaria faberii | 75 | 96 | 67 | 79 |
| Xanthium pensylvanicum | 100 | 100 | 100 | 95 |

| kg/ha | II + VI | | | |
|---|---|---|---|---|
| | 1.0 + 1.0 | 0.5 + 2.5 | 2.5 + 0.5 | 1.5 + 1.5 |
| Crop plant: | | | | |
| Zea mays | 0 | 10 | 0 | 0 |
| Unwanted plants: | | | | |
| Amaranthus retroflexus | 100 | 100 | 100 | 100 |
| Cyperus rotundus | 100 | 90 | 100 | 100 |
| Digitaria sanguinalis | 94 | 100 | 80 | 100 |
| Setaria faberii | 69 | 96 | 74 | 87 |
| Xanthium pensylvanicum | 100 | 100 | 100 | 100 |

| kg/ha | III + VI | | | |
|---|---|---|---|---|
| | 1.5 + 0.5 | 0.5 + 1.5 | 1.0 + 1.0 | 0.5 + 2.5 |
| Crop plant: | | | | |
| Zea mays | 0 | 0 | 0 | 10 |
| Unwanted plants: | | | | |
| Amaranthus retroflexus | 100 | 100 | 100 | 100 |
| Cyperus rotundus | 100 | 89 | 100 | 98 |
| Digitaria sanguinalis | 75 | 100 | 96 | 100 |
| Setaria faberii | 67 | 82 | 73 | 95 |
| Xanthium pensylvanicum | 100 | 94 | 100 | 100 |

| kg/ha | III + VI | | IV + VI | |
|---|---|---|---|---|
| | 2.5 + 0.5 | 1.5 + 1.5 | 1.5 + 0.5 | 0.5 + 1.5 |
| Crop plant: | | | | |
| Zea mays | 0 | 0 | 0 | 0 |
| Unwanted plants: | | | | |
| Amaranthus retroflexus | 100 | 100 | 100 | 100 |
| Cyperus rotundus | 100 | 100 | 100 | 95 |
| Digitaria sanguinalis | 80 | 100 | 76 | 100 |
| Setaria faberii | 73 | 96 | 68 | 80 |
| Xanthium pensylvanicum | 100 | 100 | 100 | 96 |

| kg/ha | IV + VI | | | |
|---|---|---|---|---|
| | 1.0 + 1.0 | 0.5 + 2.5 | 2.5 + 0.5 | 1.5 + 1.5 |
| Crop plant: | | | | |
| Zea mays | 0 | 10 | 0 | 0 |
| Unwanted plants: | | | | |
| Amaranthus retroflexus | 100 | 100 | 100 | 100 |
| Cyperus rotundus | 100 | 98 | 100 | 100 |
| Digitaria sanguinalis | 95 | 100 | 82 | 100 |
| Setaria faberii | 70 | 96 | 80 | 87 |
| Xanthium pensylvanicum | 95 | 100 | 100 | 100 |

| kg/ha | I + VII | | | |
|---|---|---|---|---|
| | 1.5 + 0.5 | 0.5 + 1.5 | 1.0 + 1.0 | 0.5 + 2.5 |
| Crop plant: | | | | |
| Zea mays | 0 | 0 | 0 | 5 |
| Unwanted plants: | | | | |
| Amaranthus retroflexus | 98 | 90 | 97 | 100 |
| Cyperus rotundus | 95 | 85 | 92 | 100 |
| Digitaria sanguinalis | 70 | 95 | 90 | 100 |
| Setaria faberii | 67 | 80 | 75 | 100 |
| Xanthium pensylvanicum | 100 | 95 | 97 | 98 |

| kg/ha | I + VII | | II + VII | |
|---|---|---|---|---|
| | 2.5 + 0.5 | 1.5 + 1.5 | 1.5 + 0.5 | 0.5 + 1.5 |
| Crop plant: | | | | |
| Zea mays | 0 | 0 | 0 | 0 |
| Unwanted plants: | | | | |
| Amaranthus retroflexus | 100 | 100 | 98 | 95 |
| Cyperus rotundus | 100 | 100 | 95 | 98 |
| Digitaria sanguinalis | 85 | 98 | 70 | 95 |
| Setaria faberii | 70 | 95 | 63 | 85 |
| Xanthium pensylvanicum | 100 | 100 | 98 | 95 |

-continued

| kg/ha | II + VII | | | |
|---|---|---|---|---|
| | 1.0 + 1.0 | 0.5 + 2.5 | 2.5 + 0.5 | 1.5 + 1.5 |
| Crop plant: | | | | |
| Zea mays | 0 | 5 | 0 | 0 |
| Unwanted plants: | | | | |
| Amaranthus retroflexus | 100 | 100 | 100 | 100 |
| Cyperus rotundus | 96 | 92 | 100 | 100 |
| Digitaria sanguinalis | 90 | 100 | 87 | 98 |
| Setaria faberii | 74 | 100 | 70 | 90 |
| Xanthium pensylvanicum | 100 | 100 | 100 | 100 |

| kg/ha | III + VII | | | |
|---|---|---|---|---|
| | 1.5 + 0.5 | 0.5 + 1.5 | 1.0 + 1.0 | 0.5 + 2.5 |
| Crop plant: | | | | |
| Zea mays | 0 | 0 | 0 | 5 |
| Unwanted plants: | | | | |
| Amaranthus retroflexus | 100 | 100 | 100 | 100 |
| Cyperus rotundus | 98 | 92 | 96 | 97 |
| Digitaria sanguinalis | 72 | 97 | 93 | 100 |
| Setaria faberii | 67 | 84 | 77 | 100 |
| Xanthium pensylvanicum | 100 | 100 | 100 | 100 |

| kg/ha | III + VII | | IV + VII | |
|---|---|---|---|---|
| | 2.5 + 0.5 | 1.5 + 1.5 | 1.5 + 0.5 | 0.5 + 1.5 |
| Crop plant: | | | | |
| Zea mays | 0 | 0 | 0 | 0 |
| Unwanted plants: | | | | |
| Amaranthus retroflexus | 100 | 100 | 100 | 100 |
| Cyperus rotundus | 100 | 100 | 100 | 98 |
| Digitaria sanguinalis | 77 | 98 | 70 | 95 |
| Setaria faberii | 76 | 97 | 64 | 82 |
| Xanthium pensylvanicum | 100 | 100 | 100 | 100 |

| kg/ha | IV + VII | | | |
|---|---|---|---|---|
| | 1.0 + 1.0 | 0.5 + 2.5 | 2.5 + 0.5 | 1.5 + 1.5 |
| Crop plant: | | | | |
| Zea mays | 0 | 5 | 0 | 0 |
| Unwanted plants: | | | | |
| Amaranthus retroflexus | 100 | 100 | 100 | 100 |
| Cyperus rotundus | 100 | 100 | 100 | 100 |
| Digitaria sanguinalis | 97 | 100 | 90 | 100 |
| Setaria faberii | 75 | 100 | 77 | 94 |
| Xanthium pensylvanicum | 97 | 100 | 100 | 100 |

| kg/ha | I + VIII | | II + VIII | |
|---|---|---|---|---|
| | 1.0 + 1.0 | 1.5 + 1.5 | 1.0 + 1.0 | 1.5 + 1.5 |
| Crop plant: | | | | |
| Zea mays | 21 | 33 | 25 | 39 |
| Unwanted plants: | | | | |
| Amaranthus retroflexus | 85 | 95 | 95 | 100 |
| Cyperus rotundus | 80 | 96 | 90 | 97 |
| Digitaria sanguinalis | 90 | 100 | 90 | 100 |
| Setaria faberii | 82 | 94 | 80 | 95 |
| Xanthium pensylvanicum | 95 | 100 | 95 | 100 |

| kg/ha | III + VIII | | IV + VIII | |
|---|---|---|---|---|
| | 1.0 + 1.0 | 1.5 + 1.5 | 1.0 + 1.0 | 1.5 + 1.5 |
| Crop plant: | | | | |
| Zea mays | 24 | 35 | 30 | 49 |
| Unwanted plants: | | | | |
| Amaranthus retroflexus | 96 | 100 | 97 | 100 |
| Cyperus rotundus | 94 | 100 | 95 | 100 |
| Digitaria sanguinalis | 90 | 100 | 96 | 100 |
| Setaria faberii | 80 | 100 | 83 | 97 |
| Xanthium pensylvanicum | 96 | 100 | 97 | 100 |

0 = no damage
100 = complete destruction

EXAMPLE 4

In the open the unwanted plants redroot pigweed (*Amaranthus retroflexus*), purple nutsedge (*Cyperus rotundus*), large crabgrass (*Digitaria sanguinalis*), giant foxtail (*Setaria faberii*) and common cocklebur (*Xanthium pensylvancium*) were treated during emergence and after emergence of the crop plant Indian corn (*Zea mays*) with the following amounts of the following individual active ingredients and mixtures thereof in the form of granules:

I 3-isopropyl-2,1,3-benzothiadiazinone-(4)-2,2-dioxide,
   0.5, 1.0, 1.5 and 2.0 kg/ha;
II 2-ethylamino-4-(1-methyl-3-oxabutyl)-amino-6-chloro-1,3,5-triazine,
   0.5, 1.0, 1.5 and 2.0 kg/ha;
III 2-chloro-4-ethylamino-6-isopropylamino-1,3,5-triazine,
   0.5, 1.0, 1.5 and 2.0 kg/ha;
IV 2-chloro-4,6-diethylamino-1,3,5-triazine,
   0.5, 1.0, 1.5 and 2.0 kg/ha;
I + II 1.5 + 0.5, 0.5 + 1.5 and 1.0 + 1.0 kg/ha;
I + III 1.5 + 0.5, 0.5 + 1.5 and 1.0 + 1.0 kg/ha;
I + IV 1.5 + 0.5, 0.5 + 1.5 and 1.0 + 1.0 kg/ha.

After 2 to 3 weeks it was ascertained that the mixtures I + II, I + III and I + IV had a better herbicidal action than their individual components, combined with the same good crop plant compatibility.

The results of this experiment are given below:

| kg/ha | 0.5 | 1.0 | I 1.5 | 2.0 |
|---|---|---|---|---|
| Crop plant: | | | | |
| Zea mays | 0 | 0 | 0 | 0 |
| Unwanted plants: | | | | |
| Amaranthus retroflexus | 28 | 35 | 55 | 75 |
| Cyperus rotundus | 22 | 60 | 70 | 80 |
| Digitaria sanguinalis | 4 | 8 | 10 | 14 |
| Setaria faberii | 3 | 5 | 9 | 15 |
| Xanthium pensylvanicum | 24 | 35 | 54 | 60 |

| kg/ha | 0.5 | 1.0 | II 1.5 | 2.0 |
|---|---|---|---|---|
| Crop plant: | | | | |
| Zea mays | 0 | 0 | 0 | 0 |
| Unwanted plants: | | | | |
| Amaranthus retroflexus | 15 | 26 | 35 | 54 |
| Cyperus rotundus | 9 | 18 | 28 | 35 |
| Digitaria sanguinalis | 20 | 45 | 63 | 80 |
| Setaria faberii | 10 | 24 | 35 | 49 |
| Xanthium pensylvanicum | 10 | 20 | 28 | 40 |

| kg/ha | 0.5 | 1.0 | III 1.5 | 2.0 |
|---|---|---|---|---|
| Crop plants: | | | | |
| Zea mays | 0 | 0 | 0 | 0 |
| Unwanted plants: | | | | |
| Amaranthus retroflexus | 20 | 47 | 63 | 85 |
| Cyperus rotundus | 9 | 23 | 28 | 33 |
| Digitaria sanguinalis | 24 | 50 | 70 | 90 |
| Setaria faberii | 12 | 23 | 32 | 41 |
| Xanthium pensylvanicum | 10 | 20 | 30 | 42 |

| kg/ha | 0.5 | 1.0 | IV 1.5 | 2.0 |
|---|---|---|---|---|
| Crop plant: | | | | |
| Zea mays | 0 | 0 | 0 | 0 |
| Unwanted plants: | | | | |
| Amaranthus retroflexus | 17 | 30 | 43 | 57 |
| Cyperus rotundus | 7 | 13 | 18 | 25 |
| Digitaria sanguinalis | 15 | 31 | 48 | 60 |
| Setaria faberii | 10 | 20 | 27 | 45 |
| Xanthium pensylvanicum | 7 | 15 | 20 | 28 |

| kg/ha | 0.5 + 1.5 | I + II 1.5 + 0.5 | 1.0 + 1.0 |
|---|---|---|---|
| Crop plant: | | | |
| Zea mays | 0 | 0 | 0 |
| Unwanted plants: | | | |
| Amaranthus retroflexus | 90 | 97 | 100 |
| Cyperus rotundus | 90 | 89 | 96 |
| Digitaria sanguinalis | 97 | 75 | 87 |
| Setaria faberii | 68 | 65 | 75 |
| Xanthium pensylvanicum | 80 | 80 | 81 |

| kg/ha | 0.5 + 1.5 | I + III 1.5 + 0.5 | 1.0 + 1.0 |
|---|---|---|---|
| Crop plant: | | | |
| Zea mays | 0 | 0 | 0 |
| Unwanted plants: | | | |
| Amaranthus retroflexus | 100 | 98 | 100 |
| Cyperus rotundus | 95 | 97 | 99 |
| Digitaria sanguinalis | 98 | 81 | 96 |
| Setaria faberii | 70 | 60 | 67 |
| Xanthium pensylvanicum | 89 | 85 | 93 |

| kg/ha | 0.5 + 1.5 | I + IV 1.5 + 0.5 | 1.0 + 1.0 |
|---|---|---|---|
| Crop plant: | | | |
| Zea mays | 0 | 0 | 0 |
| Unwanted plants: | | | |
| Amaranthus retroflexus | 95 | 90 | 98 |
| Cyperus rotundus | 84 | 97 | 92 |
| Digitaria sanguinalis | 88 | 79 | 80 |
| Setaria faberii | 65 | 54 | 58 |
| Xanthium pensylvanicum | 75 | 80 | 78 |

0 = no damage
100 = complete destruction

I claim:

1. A herbicide composition containing a herbicidally effective amount of a mixture consisting essentially of
   a. a member selected from the group consisting of 2-ethylamino-4-(1-methyl-3-oxabutyl)amino-6-chloro-1,3,5-triazine, 2-chloro-4-ethylamino-6-isopropylamino-1,3,5-triazine, and 2-(2-chloro-4-ethylamino-1,3,5-triazin-6-ylamino)-2-methylpropionitrile, and
   b. a member selected from the group consisting of 3-isopropyl-2,1,3-benzothiadiazinone-(4)-2,2-dioxide or the sodium, dimethylamine, or diethanolamine salt thereof in a weight ratio of compounds a:b in the range of 1:0.2-5, respectively.

2. A herbicide composition containing a herbicidally effective amount of a mixture consisting essentially of
   a. 2-chloro-4,6-diethylamino-1,3,5-triazine, and
   b. 3-isopropyl-2,1,3-benzothiadiazinone-(4)-2,2-dioxide in a weight ratio of (a) to (b) in the range of 3:1 to 1:3.

\* \* \* \* \*